(12) United States Patent
Bhola et al.

(10) Patent No.: US 8,706,648 B2
(45) Date of Patent: Apr. 22, 2014

(54) ASSESSING SOCIAL RISK DUE TO EXPOSURE FROM LINKED CONTACTS

(75) Inventors: Saurabh Bhola, Drogheda (IE); Mark Crosbie, Malahide (IE); Gary Denner, Longwood (IE); Daniel C. Gurney, Worcester, MA (US); Rohit Jain, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/252,188

(22) Filed: Oct. 3, 2011

(65) Prior Publication Data

US 2013/0085953 A1 Apr. 4, 2013

(51) Int. Cl.
*G06Q 10/00* (2012.01)
*G06Q 50/00* (2012.01)

(52) U.S. Cl.
CPC ........................ *G06Q 50/01* (2013.01)
USPC ........................................ 705/319

(58) Field of Classification Search
CPC .................................. G06Q 50/01
USPC ............................... 705/1, 1.1, 319
See application file for complete search history.

(56) References Cited

U.S. PATENT DOCUMENTS

| | | | |
|---|---|---|---|
| 7,886,334 B1 | 2/2011 | Walsh et al. | 726/1 |
| 2006/0020814 A1* | 1/2006 | Lieblich et al. | 713/182 |
| 2007/0056020 A1 | 3/2007 | Ward | 726/3 |
| 2008/0172412 A1 | 7/2008 | Gruhl et al. | 707/104.1 |
| 2008/0307235 A1 | 12/2008 | Keohane et al. | 713/183 |
| 2009/0006575 A1* | 1/2009 | Hulten et al. | 709/207 |
| 2009/0094187 A1* | 4/2009 | Miyaki | 707/1 |
| 2009/0265639 A1* | 10/2009 | Shuster | 715/747 |
| 2010/0262649 A1 | 10/2010 | Fusz | 709/203 |
| 2011/0016533 A1 | 1/2011 | Zeigler et al. | 726/26 |
| 2011/0046980 A1 | 2/2011 | Metzler et al. | 705/3 |
| 2011/0047404 A1 | 2/2011 | Metzler et al. | 714/2 |
| 2011/0113113 A1 | 5/2011 | Ryan et al. | 709/206 |

FOREIGN PATENT DOCUMENTS

| | | | | |
|---|---|---|---|---|
| WO | WO/2006/019513 | 2/2006 | | H04L 29/06 |
| WO | WO 2009/070138 | 6/2009 | | G06F 17/00 |

OTHER PUBLICATIONS

Becker et al. "Measuring Privacy Risk in Online Social Networks". University of California, 2009.*
"The Identity Guard eBook Provides Identity Theft and Credit Management Tips to Help Consumers with Credit Reports and Scores". Business Wire [New York] Jun. 17, 2011.*

(Continued)

*Primary Examiner* — Gabrielle McCormick
(74) *Attorney, Agent, or Firm* — VanLeeuwen & VanLeeuwen; Jeffrey S. LaBaw

(57) ABSTRACT

An approach is provided in which a risk assessment is performed that accesses the risk to a user of an information handling system due to the user's link to a social network contact. Risky action values is received with the values corresponding to the social network contact. A risk level is calculated with the risk level corresponding to one or more of the risky action values. A preventative security action is then performed based on the calculated risk level. In another embodiment, an approach is provided in which the potential risks posed by a user are transmitted to the user's social network contacts. In this approach, potentially risky actions that are performed by the user are detected. Risky action values are identified that correspond to the detected potentially risky actions. The risky action values are then transmitted to the user's social network contacts over a computer network.

16 Claims, 12 Drawing Sheets

(56) References Cited

OTHER PUBLICATIONS

Becker, et al., "Measuring Privacy Risk in Online Social Networks," University of California, 2009.

Holzmann, et al., "Social Risk Management: A new conceptual framework for Social Protection, and beyond," The World Bank, Feb. 2000.

International Search Report and Written Opinion for PCT Application No. PCT/JP2012/005852, mailed Dec. 11, 2012, 8 pages.

Office Action for U.S. Appl. No. 13/252,192 (Bhola et al., "Receiving Security Risk Feedback From Linked Contacts Due to a User's System Actions and Behaviors," filed Oct. 3, 2011), U.S. Patent and Trademark Office, mailed Jul. 11, 2013, 10 pages.

* cited by examiner

ASSESSING SOCIAL RISK DUE TO EXPOSURE FROM LINKED CONTACTS

TECHNICAL FIELD

The present disclosure relates to an approach that provides assesses a user's computer security risks due to the user's social networking contacts.

BACKGROUND OF THE INVENTION

Social media is an increasingly popular network-based technology that creates an interactive dialog between users by utilizing network (web) based services, mobile pervasive computer devices (e.g., mobile telephones, etc.) and traditional computer devices (e.g., personal desktop and notebook computer systems, etc.). While social media can take many forms including forums, weblogs, blogs, wikis, photographs, video, and the like, the common aspect is online users communicating with multiple contacts, often by using an aggregated social network platform.

In traditional social media settings, a user has little or no means of analyzing security behavior conducted by the user's social media contacts. Personal or confidential data shared with a user's contacts, therefore, can potentially fall into the hands of malevolent individuals (e.g., hackers, etc.) that gain access to a contact's social media login or data. Moreover, traditional systems provide little or no means for a user to detect or otherwise understand that a malevolent individual has gained access to the user's personal and/or confidential data by way of one of the user's social media contacts.

SUMMARY

An approach is provided in which a risk assessment is performed that accesses the risk to a user of an information handling system due to the user's link to a social network contact. A set of risky action values is received with the set corresponding to the social network contact. A risk level is calculated with the risk level corresponding to one or more of the risky action values. A preventative security action is then performed based on the calculated risk level.

In another embodiment, an approach is provided in which the potential risks posed by a user are transmitted to the user's social network contacts. In this approach, potentially risky actions that are performed by the user are detected. Risky action values are identified that correspond to the detected potentially risky actions. The risky action values are then transmitted to the user's social network contacts over a computer network.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
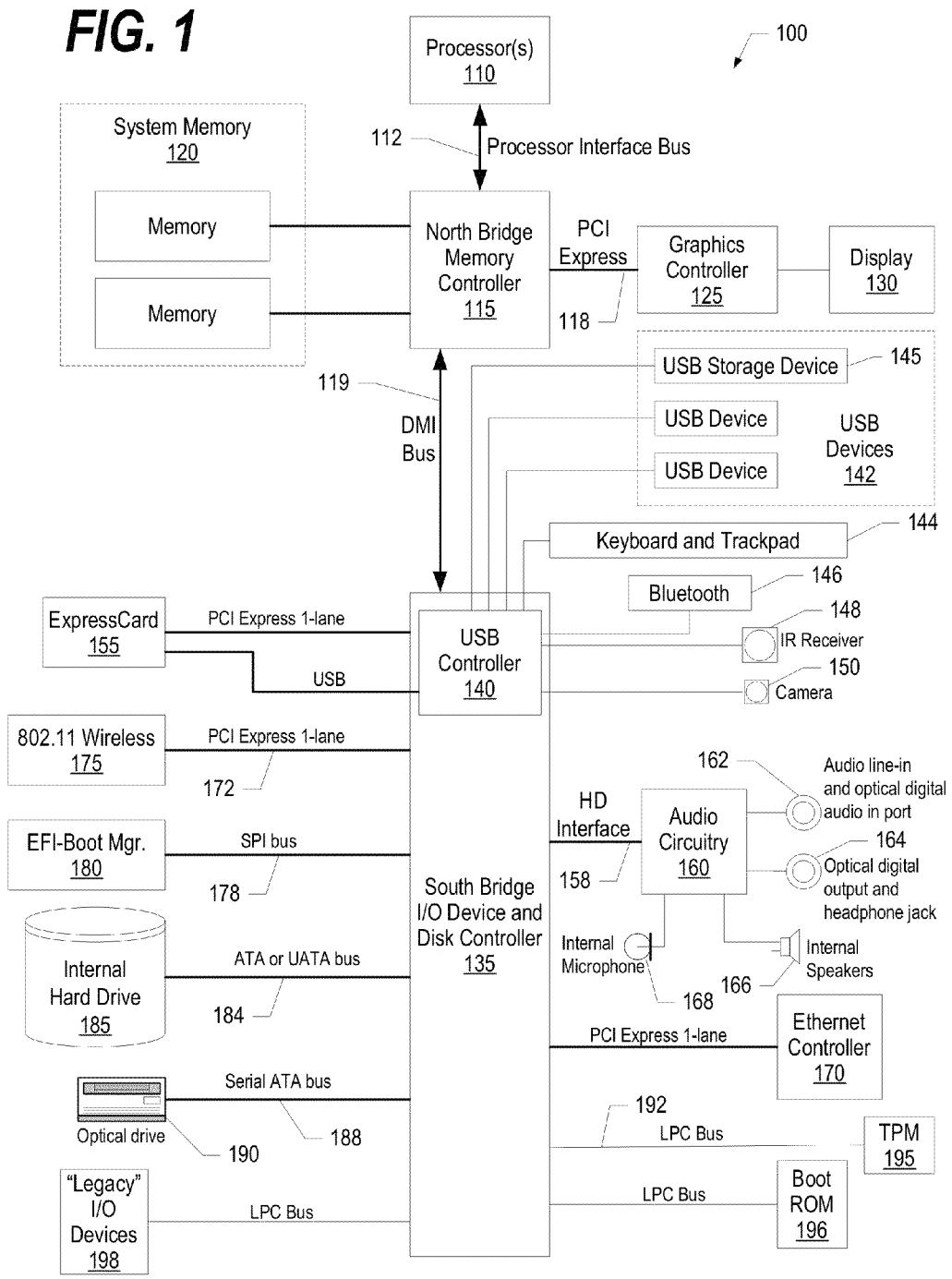
FIG. 1 is a block diagram of a data processing system in which the methods described herein can be implemented.
Figure 2:
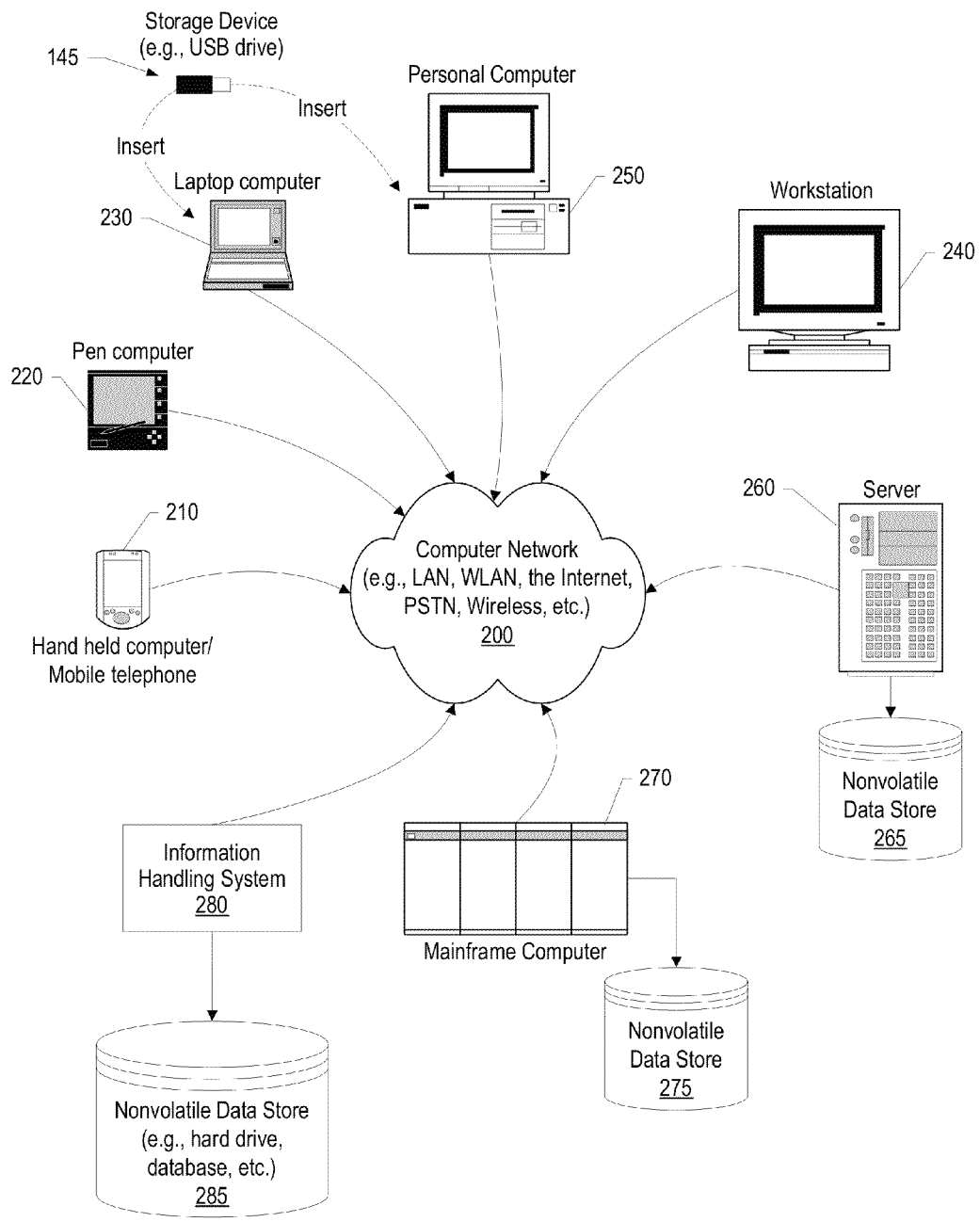
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
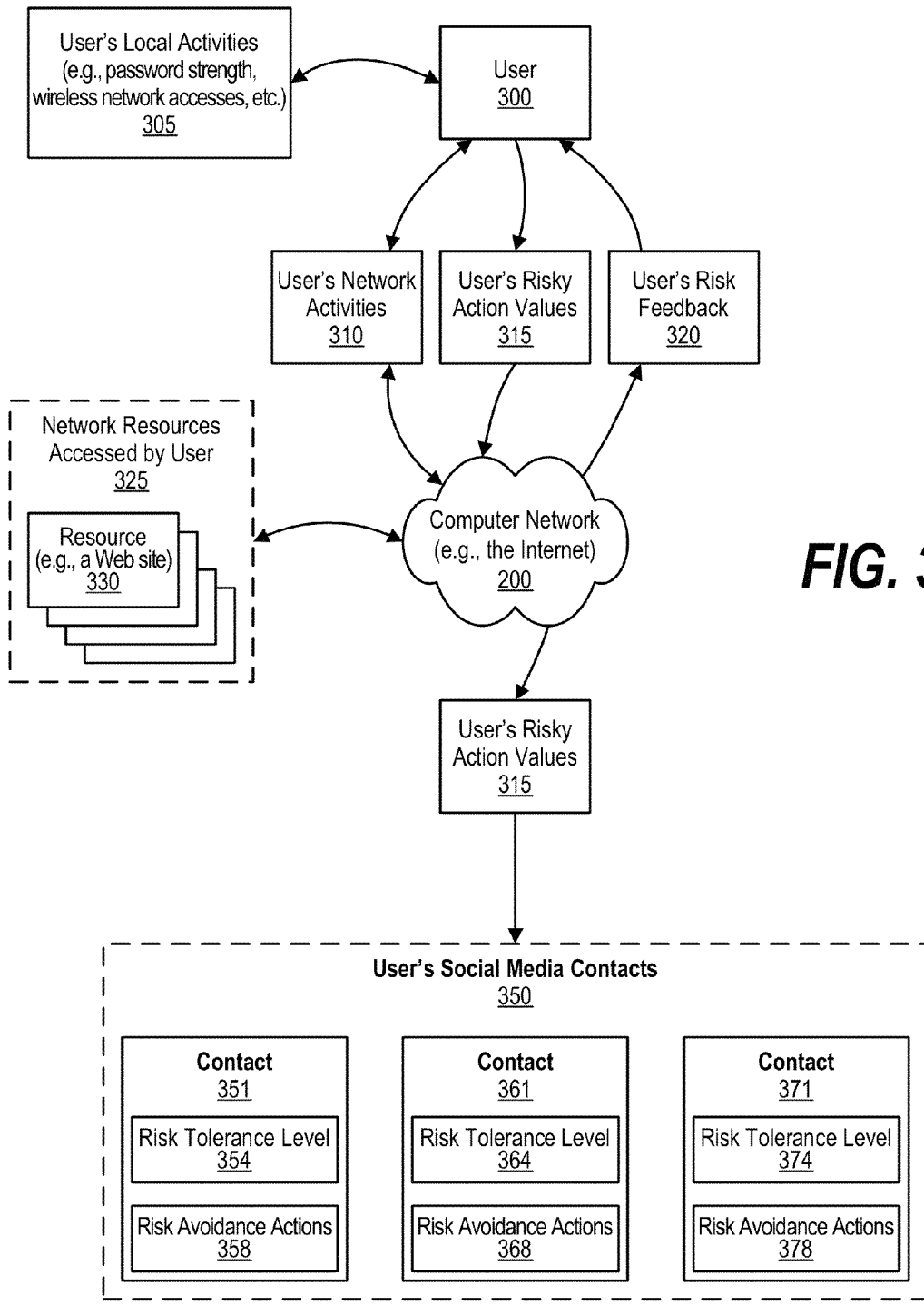
FIG. 3 is a diagram showing network components utilized by a user and the user's contacts in analyzing the user's potentially risky actions.

FIG. 3 is a diagram showing network components utilized by a user and the user's contacts in analyzing the user's potentially risky actions. FIG. 3 and subsequent figures addresses the challenge of sharing information with contacts in a dynamic social network where a subset of your contacts may engage in online behavior that the user deems to be "risky," thus putting the user's information at risk unintentionally. As the use of social networking tools increases, there is an increasing risk that personal and confidential information may be exposed to others unintentionally. While many social networking sites allow users to set privacy rules regarding shared information, these sites do not allow users to measure the actual behavior of our social networking contacts (e.g., friends, colleagues, etc.) regarding the information shared with them. Knowledge of how careful our social networking contacts are with their own social-networking security is obtained by a tracking routine installed on the contact's information handling system (e.g., on their PC, mobile device, smart phone, etc.).

For example, assume a user named "Alice" has added another user named "Bob" as a contact on a social network, and that Alice has shared personal information about her upcoming vacation with Bob. Bob, in turn, has many other social networking contacts, and participates in other social networking activities online using various social networking sites. In a traditional environment, not all of Bob's activity online is known to Alice, nor does Alice see how Bob accesses the Internet or what security measures Bob takes (or does not take) to protect his online security. A threat to Alice arises when Bob visits an unsecured wireless network to participate in other online activities. Bob does not enforce strong network security to protect his online identity, nor does he pay much attention to the software he installs and runs on his PC. In a traditional setting, a hacker may be able to capture Bob's social network password from the wireless network. With Bob's identity compromised, the hacker is able to gain access to Alice's personal data through her social networking association with Bob. The hacker is now able to send messages to Alice that appear to be sent by Bob. In addition, the hacker is able to launch various attacks against Bob by emailing a link to a malicious web-application that appears to come from Bob's social network. Bob's identity, and his personal machine, are completely compromised by the hacker. The approach shown in FIG. 3 and subsequent Figures address a means of protecting Alice in the above scenario by alerting her of Bob's poor approach to online security. Being aware that Bob's behavior creates a risk to her allows Alice to take various security measures in light of her knowledge about Bob's poor security practices. These security measures can include informing Alice about Bob's behavior so that she might not trust messages that appear to come from Bob. In addition, Bob can be informed that his behavior is creating a risk to his online contacts so that he can take better care to avoid such security risks. Other measures can include disassociating (e.g., "un-friending," etc.) so that Bob is no longer able to access Alice's information through the social networking site. Being aware of the risk Bob poses provides Alice with a powerful tool and insight that can be used to better protect Alice's personal and confidential information.

User 300 is a user of an information handling system such as a notebook computer system, mobile telephone (e.g., smart phone, etc.), desktop computer system, or any other type of information handling system. In using the information handling system, the user performs a number of local and network-based activities. Local activities 305 and network activities 310 are both tracked by a tracking agent that is installed on user's information handling system 300.

Some activities might not be identified as potentially risky activities, while other activities, such as using a wireless network (WiFi), accessing a website, or entering site or device passwords may be deemed potentially risky activities. As shown, local activities 305 include activities such as entering local (e.g., device, etc.) passwords and obtaining access to a wireless network (WiFi). Accessing an unprotected WiFi is a potentially risky activity in that other user's of the WiFi may be able to "snoop" the user's system while the user is utilizing the unprotected WiFi.

Network activities 310 involve network resources 325 that are accessed by the user. Accessing some network resources, such as particular websites 330, may be noted as potentially risky activities because of either the history/content of the resource (e.g., a network chat room known for hackers that try to obtain data to hack systems and accounts of users that visit the chat room, etc.). In addition, some resources, such as social media network sites, may require the use of a password to gain access. Visiting these types of network resources is a potentially risky activity especially if the user has established a relatively weak password to access the site. For example, if the user has established his or her name or birth date as the password, a malevolent individual may gain access to the user's account due to the weakness of the user's password.

The tracking agent installed on user's information handling system 300 detects the potentially risky actions performed by the user and identifies a risky action value to associate with the activity. For example, if the potentially risky action is a password used to access a website, then the risky action value may be a low value when the password strength of the password established by the user is strong. Likewise, the risky action value may be a high value when the password strength is low (e.g., the user's name or birth date, etc.). Using another example, if the potentially risky action is accessing a website, then the risky action value may be a low value when the website is known to be relatively safe and a high value when the website is known to be frequented by malevolent individuals seeking data used to hack systems. The user's risky action values 315 are transmitted through computer network 200, such as the Internet, to the user's social media contacts 350.

Social media contacts 350 include a number of contacts of the user. In the example shown, the social media contacts include contacts 351, 361, and 371. Each of the contacts can establish a risk tolerance level based on the contact's environment and personal preferences (risk tolerance levels 354, 364, and 374 corresponding to contacts 351, 361, and 371, respectively). In addition, the contacts can establish risk avoidance actions to perform when the established risk tolerance levels are exceeded (risk avoidance levels 358, 368, and 378 corresponding to contacts 351, 361, and 371, respectively). For example, contact 351 may have a low tolerance level for use of unprotected WiFi networks so if the user's risky action values reaches a relatively low value, then the contact may disassociate (unlink) from the user in the social network. Meanwhile, contact 361 may have a low tolerance level for the use of an unprotected WiFi network but may set the risk avoidance action to send the user a message indicating dissatisfaction with the user's use of the unprotected WiFi network and may only disassociate (unlink) from the user in the social network when the risky action value for using unprotected WiFi networks reaches a higher value. Finally, contact 371 may not be as concerned with the user of unprotected WiFi networks so contact 371 can set a higher threshold and can set the avoidance action to send the user a message when the higher threshold is reached.

Similar customizations can be made by each of the contacts regarding other categories of risky activities such as password strength and access of potentially risky websites. In addition, when implemented in an organizational setting, the organization, such as a company's IT department, can set risk tolerance levels and risk avoidance levels that are used by all of the users in the organization. The avoidance actions in an organizational setting may include notifying a security function within the IT department.

Figure 4:
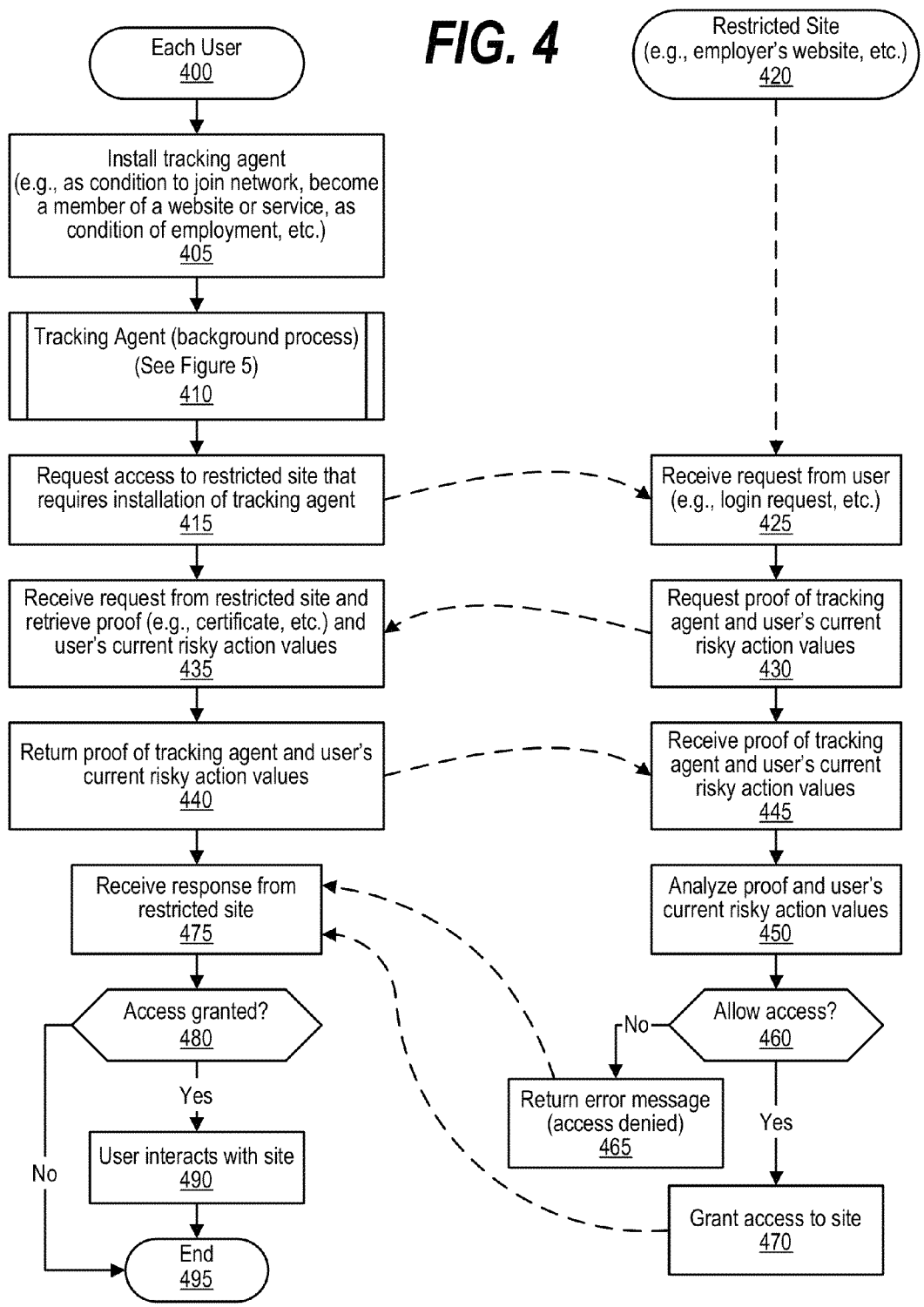
FIG. 4 is a flowchart showing the installation of a tracking agent by multiple users as condition precedent for accessing a restricted site.

FIG. 4 is a flowchart showing the installation of a tracking agent by multiple users as condition precedent for accessing a restricted site. The process shown in FIG. 4 may be utilized in order to motivate individuals to install the tracking agent so that potentially risky activities can be tracked and reported to the user's social network contacts. User processing is shown commencing at 400 whereupon, at step 405, the user installs the tracking agent on the user's information handling system. The installation of the tracking agent may be performed as a condition to join/access a website or network (such as the social networking site), as a condition of employment, etc. After installation, in predefined process 410, the tracking agent operates as a background process (see FIG. 5 and corresponding text for processing details). While the user is using the information handling system, at some point as illustrated by step 415, the user requests access to restricted site 420, such as an employer's website, an organizations network resource, etc. The request is sent to the restricted site. In addition, much like the restricted site shown in FIG. 4, a user can make it a condition that each of their contacts have the tracking agent installed before the user will associate (e.g., "friend," etc.) the various contacts.

Processing performed by the restricted site is shown commencing at 420 whereupon, at step 425, the restricted site receives the user's request. At step 430, the restricted site sends a request to the user requesting proof that the tracking agent is installed and running as well as the user's current risky action values.

Returning to user processing, at step 435, the user receives the request from the restricted site and the user's information handling system retrieves proof that the tracking agent is running along with the current risky action values. In one embodiment, a hash of the tracking agent software routine is performed resulting in a hash value that is combined with a non-static data item, such as the current timestamp. At step 440, the proof of the installation of the tracking agent is returned to the restricted site along with the user's current risky action values.

Turning back to processing performed by the restricted site, at step 445, the site receives the user's proof that the tracking agent is running on the user's system along with the user's current risky action values. At step 450, the restricted site analyzes the received proof and the user's current risky action values. A decision is made by the restricted site whether to allow the user access to the restricted site (decision 460). If access is not allowed (e.g., the proof was invalid or the user's risky action values indicate that the user is running in a risky state that may compromise the restricted site, etc.) then decision 460 branches to the "no" branch whereupon, at step 460 an error message is returned to the user indicating that access to the restricted site is denied. On the other hand, if access is allowed (e.g., the proof of the tracking agent is valid and the user's current risky action values do not exceed tolerance levels established by the site, etc.), then decision 460 branches to the "yes" branch whereupon, at step 470, the user is granted access to the restricted site.

Returning to processing performed at the user's information handling system, at step 475 a response is received from the restricted site. A decision is made as to whether the user has been granted access to the restricted site (decision 480). If access has been granted, then decision 480 branches to the "yes" branch whereupon, at step 490, the user interacts with the restricted site by using the information handling system. On the other hand, if access to the restricted site was denied, then decision 480 branches to the "no" branch bypassing step 490. User processing thereafter ends at 495.

Figure 5:
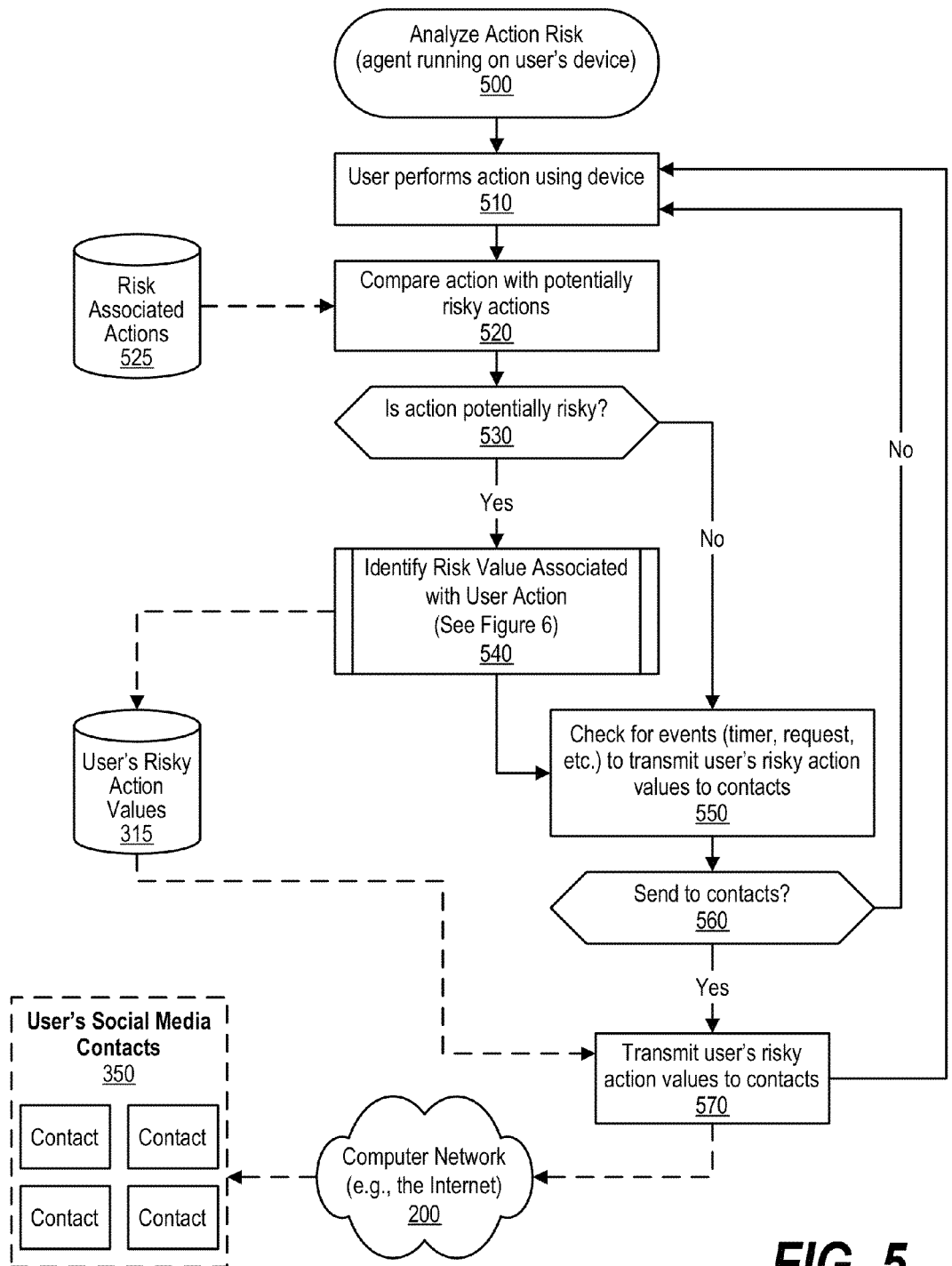
FIG. 5 is a flowchart showing steps performed by the installed tracking agent to analyze the risk of actions performed by the user.

FIG. 5 is a flowchart showing steps performed by the installed tracking agent to analyze the risk of actions performed by the user. Tracking agent processing is shown commencing at 500 whereupon, at step 510, the user performs an action using the device (e.g., the information handling system, etc.). At step 520, the action performed by the user is compared with potentially risky actions stored in risk associated actions data store 525. Many actions, such as playing a game of solitaire, may not be deemed to be potentially risky actions, while other actions, such as entering a password, accessing a wireless network (WiFi), or accessing a website may be deemed potentially risky actions.

A decision is made as to whether the action that was detected as being performed by the user is a potentially risky action (decision 530). If the action that was requested by the user is a potentially risky action, then decision 530 branches to the "yes" branch whereupon, at predefined process 540, the risk value associated with the user action is identified (see FIG. 6 and corresponding text for processing details). The identified risky action value or values associated with the activity are stored in user's risky action values data store 315. Returning to decision 530, if the action requested by the user and performed by the user's information handling system is not identified as a potentially risky action, then decision 530 branches to the "no" branch bypassing predefined process 540.

At step 550, the tracking agent running on the user's information handling system checks for one or more events that may have occurred indicating that it is time to send the user's risky action values to the user's social network clients. Events that trigger sending of the risky action values may include a timer (e.g., send the risky action values every hour, etc.), a request (e.g., when requested by a contact, etc.), or other types of events (e.g., initial logon/boot sequence, etc.). A decision is made as to whether it is time to send the user's risky action values to the user's social network contacts (decision 560). If it is not yet time to send the data, then decision 560 branches to the "no" branch which loops back to detect and process the next action requested by the user and performed by the user's information handling system. On the other hand, an event has occurred indicating that it is time to send the user's risky action values to the user's social network contacts, then decision 560 branches to the "yes" branch whereupon, at step 570, the user's risky action values stored in data store 315 are transmitted to user's social media (network) contacts 350 via computer network 200 (e.g., the Internet, etc.). Processing then loops back to continue detecting and processing actions requested by the user and performed by the user's information handling system.

Figure 6:
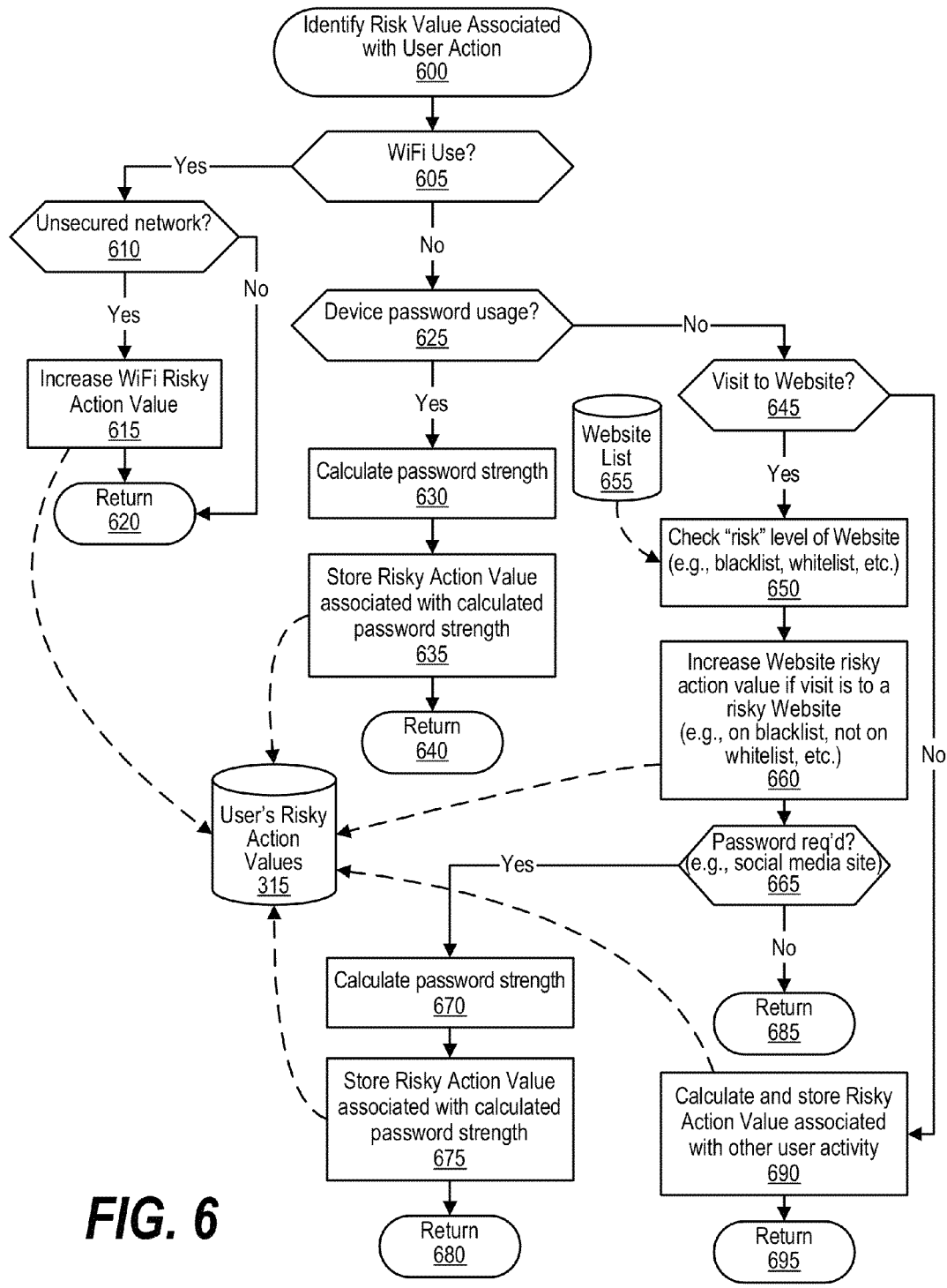
FIG. 6 is a flowchart showing steps performed by the installed tracking agent to identify a risk value associated with a potentially risky action performed by the user.

FIG. 6 is a flowchart showing steps performed by the installed tracking agent to identify a risk value associated with a potentially risky action performed by the user. The processing shown in FIG. 6 includes the details of predefined process 540 shown in FIG. 5 that was executed in order to identify the risky action values associated with the user's potentially risky action. As shown in FIG. 6, the tracking agent identifies the type of potentially risky action performed and also identifies a risky action value to associate with the action.

A decision is made as to whether the action was use of a wireless network (WiFi) as shown in decision 605. If the action was WiFi use, then decision 605 branches to the "yes" branch whereupon the tracking agent identifies whether an unsecured or secured WiFi network was accessed by the user. If an unsecured WiFi network was accessed by the user, then decision 610 branches to the "yes" branch whereupon the user's risky action value for WiFi usage is increased to indicate a higher risk level and this value is stored in user's risky action values data store 315. On the other hand, if the WiFi usage is a secured WiFi network, then decision 610 branches to the "no" branch bypassing step 615. In other embodiments, secured WiFi networks using less secure types of protection can be increased at a lesser rate indicating that they are safer than accessing an unsecured WiFi but are not accessing the WiFi using the safest possible type of protection. Processing then returns to the calling routine (see FIG. 5) at 620.

Returning to decision 605, if the user action is not accessing a WiFi network, then decision 605 branches to the "no" branch whereupon a decision is made as to whether the action is entry of a device password (e.g., sign-on password to access the information handling system, unlock password used to unlock the information handling system, etc.) at decision 625. If a device password is being used by the user, then decision 625 branches to the "yes" branch whereupon, at step 630, the tracking agent uses a routine to calculate the password strength of the password entered by the user. A device password can be captured by a BIOS enabled key-logging routine that checks and records the user entry of a password used to access the device. An operating-system level password can be captured by an operating system extension used to monitor the user's entry of a password when accessing the operating system. In addition, the BIO enabled key-logging routine and the operating system extension can indicate when no password has been enabled. Password strength is a measure of the effectiveness of a password in resisting guessing and brute-force attacks. A password strength calculator sets a value indicating an estimate of how many trials an attacker who does not have direct access to the password would need, on average, to guess it correctly. The strength of a password is a function of length, complexity, and unpredictability. At step 635, the risky action value associated with the calculated password strength is stored in user's risky action values data store 315. Processing then returns to the calling routine (see FIG. 5) at 640.

Returning to decision 625, if the user action is not accessing a WiFi network or entry of a device password, then decision 625 branches to the "no" branch whereupon a decision is made as to whether the user's action was to visit a website (decision 645). If the user's action was to visit a website, then decision 645 branches to the "yes" branch whereupon at step 650 a check is made of the website that was visited by comparing the website (e.g., the URL, etc.) to a list of websites stored in data store 655. If a "blacklist" approach is used, then a website listed in website list 655 is a known trouble spot where malevolent individuals such as hackers are known to use the website to try to gain unauthorized access to other users' computer systems. If a "whitelist" approach is used, then a website listed in website list 655 is known as being a relatively "safe" website. In addition, a combination using both blacklist and a whitelist may be utilized with risky action values being set high if the website appears on the blacklist, set low if the website appears on the whitelist, and is set somewhere in the middle if the website does not appear on either list. At step 660, the risky action value associated with website usage is increased if the user is deemed to have visited a potentially risky website. The risky action value associated with the website is stored in user's risky action values data store 315.

A decision is made as to whether a password was required to access the website, such as a password used to access a social network site, etc. (decision 665). If a password was used to access the website, then decision 665 branches to the "yes" branch whereupon, at step 670, the password strength is calculated and, at step 675, the risky action value associated with the password-protected website is set based on the calculated password strength value. The passwords used to access websites can be captured using a browser extension routine (e.g., add-in, plug-in, app, etc.) that senses the entry of a password when accessing a website. In addition, the browser extension can note whether a common password is being used by the user to access multiple websites and increase the risky action value accordingly. Different risky action values can be set based upon the password used to access the different websites. For example, the user may utilize a strong password to access a banking site, but a relatively weak password to access the social networking site. The weakness of the social networking password would be noted with a risky action value corresponding to the social networking site so that contacts that are associated with the user at the social networking site might be concerned that the user is using a weak password at the site that is used for social networking. The risky action value is stored in the user's risky action values data store 315. Processing then returns to the calling routine (see FIG. 5) at 680. Returning to decision 665, if a password was not used to access the website, then decision 665 branches to the "no" branch bypassing steps 670 and 675 and processing returns to the calling routine (see FIG. 5) at 685.

Returning to decision 645, if the potentially risky user action is not accessing a WiFi network, is not the entry of a device password, and is not the access of a website, then decision 645 branches to the "no" branch whereupon at step 690 the risky action value associated with this other form of activity is calculated and the risky action value is stored in the user's risky action values data store 315. Other actions that may be processed and have a risky action value assigned include software, especially malware, installed on the user's system, the nature of content posted by the user. Still further risky activities might include downloads of executable content, membership in peer-to-peer networks, risky settings in file sharing set in the user's operating system, outdated or nonexistent virus scanners and firewalls, and outdated updates to operating system or applications loaded on the user's system (e.g., lacking security updates, etc.). In addition, combinations of risky activities such as use of unsecured WiFi networks to log onto the social networking website. Processing then returns to the calling routine (see FIG. 5) at 695.

Figure 7:
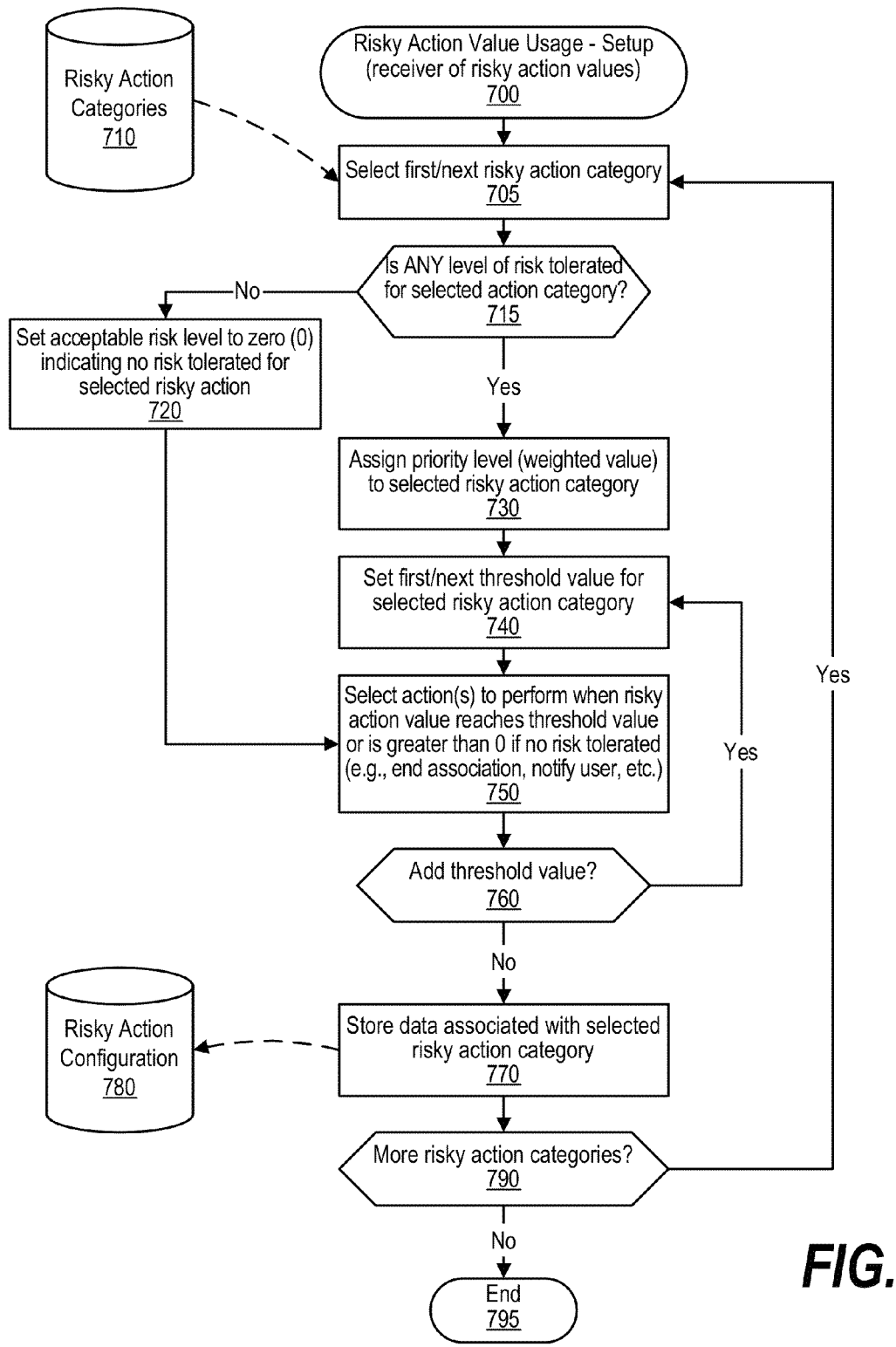
FIG. 7 is a flowchart showing steps performed by the user's contacts when receiving the risky action values associated with the user's actions.

FIG. 7 is a flowchart showing steps performed by the user's contacts when receiving the risky action values associated with the user's actions. The steps shown in FIG. 7 are used to configure thresholds corresponding to risky actions that may be performed by contacts of the user as well as the preventative security actions to perform when a threshold is exceeded.

Processing commences at 700 whereupon, at step 705, the first risky action category is selected from risky action categories data store 710. Examples of risky action categories might include wireless network (WiFi) usage, device password usage, website accesses, website password usage, etc. A decision is made as to whether the user is willing to accept ANY level of risk pertaining to the selected category (decision 715). For example, a user might not be willing to accept any risk pertaining to a contact that uses an unsecured wireless network (unsecured WiFi). If a contact of the user is using an unsecured WiFi, then the user may wish to perform various actions in order to reduce the user's exposure to risk associated with the contact's use on an unsecured WiFi (e.g., end the association ("unfriend"), notify the contact that unsecured WiFi use is an unacceptably risky activity, etc.). If no level of risk is tolerated by the user pertaining to the selected action category, then decision 715 branches to the "no" branch whereupon, at step 720, the acceptable risk level for the selected risky action category is set to zero ('0') indicating that no risk is tolerated for the selected risky action. Processing then flows to step 750, described in further detail below, so that the user can select the actions that are to be performed when any level of risk is detected from a contact pertaining to the selected risky action category. On the other hand, if some level of risk is tolerated by the user for the selected action category, then decision 715 branches to the "yes" branch to assign a priority level to the risky action category and to assign threshold values and associated actions to perform when the risky action values reach the assigned threshold values.

At step 730, the user or system administrator assigns a priority level, such as a weighted value, to assign to the selected risky action category. The priority level indicates a relative importance level of the risky action category. For example, if the user or system administrator is particularly sensitive to unprotected WiFi usage, than the priority level can be set high to use a higher weighted value with the WiFi risky action values. Likewise, if the user or system administrator is less sensitive to weak device passwords than a somewhat lower priority level can be established for device password risky action values.

At step 740, the first threshold value is selected for the selected risky action category. Using risky action values that range from zero (0) to ten (10) with zero being no risk and 10 being highest risk, then the first threshold for the selected category might be a level '3'. Next, at step 750, one or more actions that are to be performed when the set threshold is reached are selected. For example, the first action that is performed when a low threshold is reached might be to notify the user of the computer system. In the case of no risk level being acceptable (after step 720 is performed), then the threshold value is set to zero ('0') so that any risky action value that exceeds zero (zero indicating no risk), then the selected actions are performed.

A decision is made as to whether the user wishes to add additional thresholds (decision 760). If the user wants to add additional thresholds, then decision 760 branches to the "yes" branch which loops back to receive the next threshold value and associated preventative security actions. For example, using the 0 to 10 risk value range set forth above, when the risk level reaches 5 then the action may be to inform additional users, such as a system administrator. Other preventative security actions that can be performed include disassociating the user with the contact so that the contact no longer has access to the user's personal and/or confidential data via the social network.

Decision 760 continues to branch to the "yes" branch and loop back to receive further thresholds and associated preventative security actions until the user does not wish to enter more thresholds, at which point decision 760 branches to the "no" branch whereupon, at step 770, the data (threshold values and associated preventative security actions, etc.) associated with the selected risky action category are stored in risky action configuration data store 780.

A decision is made as to whether there are more risky action categories to select and process (decision 790). If there are more risky action categories to select and process, then decision 790 branches to the "yes" branch which loops back to select the next risky action category from data store 720 and process the newly selected risky action category as described above. This looping continues until there are no more risky action categories to process, at which point decision 790 branches to the "no" branch whereupon configuration processing ends at 795.

Figure 8:
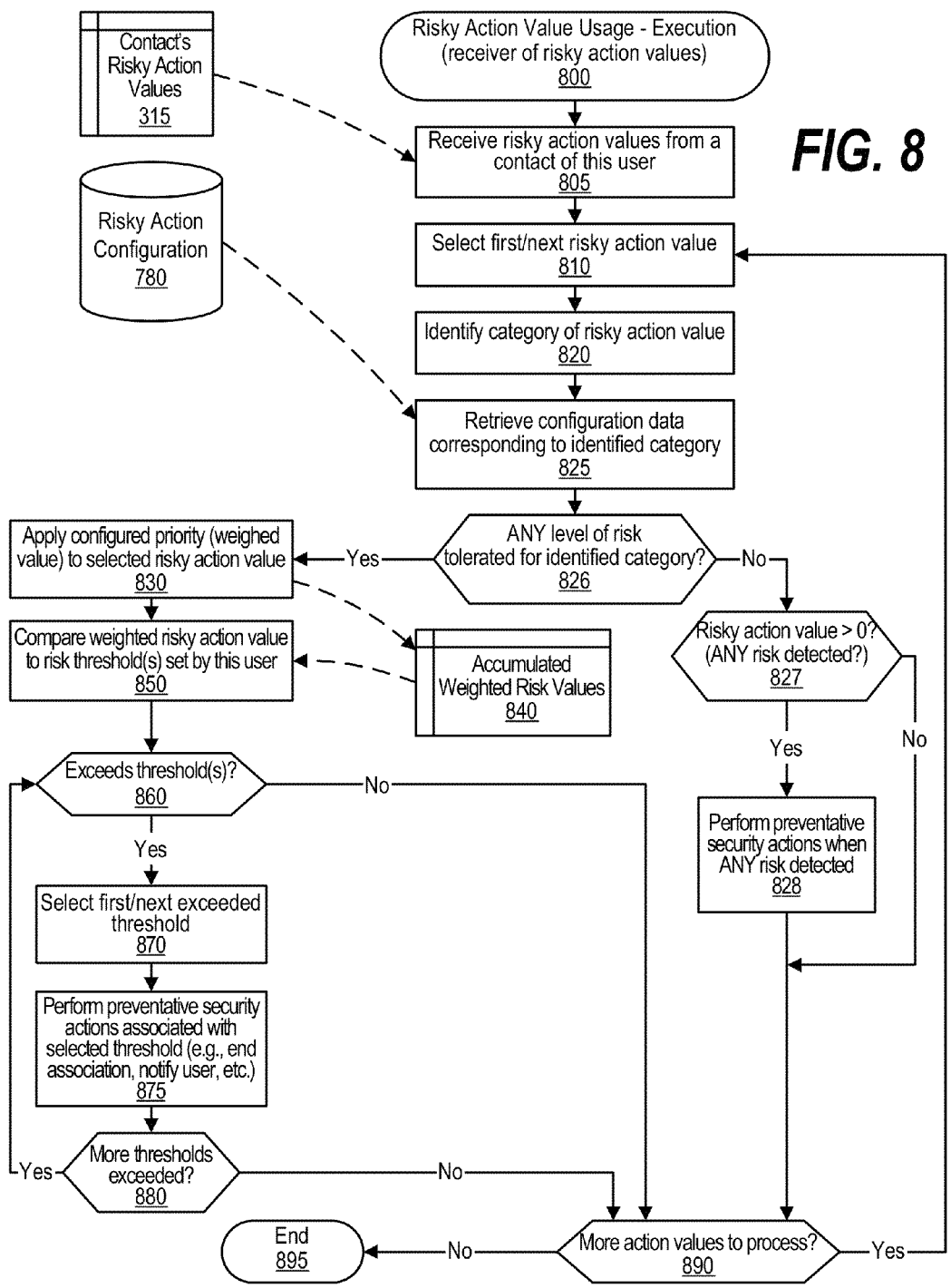
FIG. 8 is a flowchart showing steps taken by the receivers of the user's risky action values in performing preventative security actions based on the received risky action values.

FIG. 8 is a flowchart showing steps taken by the receivers of the user's risky action values in performing preventative security actions based on the received risky action values. Processing commences at 800 whereupon, at step 805, the user receives a set of risky action values (memory area 315) from a social network contact of the user. At step 810, the first risky action value is selected from memory area 315. At step 820, the risky action category that corresponds to the selected risky action value is identified. At step 825, the configuration data (e.g., priority level, threshold values, preventative security actions, etc.) corresponding to the identified risky action category is retrieved from the user's risky action configuration data store 780.

As previously described, a user might have a risk category, such as use of an unsecured wireless network (unsecured WiFi) where ANY is unacceptable. A decision is made as to whether ANY level of risk is tolerated for the identified category (decision 826). If no level of risk is tolerated for the identified category, then decision 826 branches to the "no" branch whereupon a decision is made as to whether the risky action value is greater than zero ('0') indicating some amount of risk (decision 827). If any amount of risk is detected for the identified category, then decision 827 branches to the "yes" branch whereupon, at step 828, the preventative security actions established by the user when any amount of risk is detected are performed (e.g., notify the contact, disassociate ("unfriend") the contact, etc.). On the other hand, if no amount of risk is tolerated for the identified category and no level of risk is detected for the contact, then decision 826 branches to the "no" branch bypassing step 827.

Returning to decision 826, if some level of risk is tolerated for the identified category, then decision 826 branches to the "yes" branch for further processing. At step 830, the configured priority level (e.g., a weighted value, etc.) is applied to the selected risky action value and stored in accumulated weighted risk values memory area 840. At step 850, the accumulated risk value (the calculated risk level) is compared to the threshold value established for this risky action category.

A decision is made as to whether the calculated risk level (as potentially modified by the priority level) exceeds one or more thresholds established for the risky action category (decision 860). If the calculated risk level exceeds one or more thresholds, then decision 860 branches to the "yes" branch for further processing. At step 870, the process selects the first threshold value exceeded by the calculated risk level. At step 875, one or more preventative security actions are performed based on the threshold exceeded by the calculated risk level. These preventative security actions may include notifying the social network contact, notifying the user of the information handling system, notifying other users, and disassociating the user from the social network contact so that the user is no longer linked to the contact in the social network.

A decision is made as to whether additional thresholds have been exceeded for the selected risky action category (decision 880). If additional thresholds have been exceeded, then decision 880 branches to the "yes" branch which loops back to step 870 to select and process the next exceeded threshold. This looping continues until all exceeded thresholds have been processed. Returning to decision 860, if the calculated risk level does not exceed any of the established thresholds, then decision 860 branches to the "no" branch bypassing steps 870 through 880.

A decision is made as to whether there are additional risky action values received from the social network contact that need to be processed (decision 890). If there are additional risky action values to process, then decision 890 branches to the "yes" branch which loops back to select the next risky action value received from the social network contact and the newly selected risky action value is processed as described above. This looping continues until all of the risky action values received from the social network contact have been processed, at which point decision 890 branches to the "no" branch and processing ends at 895.

Referring to the scenario presented in the discussion of FIG. 3, above, this scenario concerned online contacts (e.g., "friends," etc.) "Alice" and "Bob," where Bob's risky online behavior was shown to present a risk to Alice that was detected using the approach described in relation to FIGS. 3-8. While Bob's risky behaviors are known to Alice through the approach shown in FIGS. 3-8 and described in corresponding text, Bob, however lacks any immediate feedback that would indicate to him that his contacts, such as Alice, in Bob's social network view his online behavior as creating a high level of risk. While Bob may simply be reckless or careless, he also may be inexperienced and have little knowledge concerning risks posed by his current behavior. The approach shown in FIGS. 9-12, and described in corresponding text, provide Bob with feedback concerning Bob's risky behavior as well as providing a process to ensure less risky behavior in the future, thus better protecting his online contacts as well as himself. Bob's activities directed at ensuring less risky behavior in the future can be transmitted back to his contacts, providing them with some level of comfort and assurance that Bob is no longer engaging in such risky behavior. With this information, Bob's contacts may decide to keep their social networking association with Bob (e.g., remain "friends," etc.) rather than decide to disassociate with Bob due to his risky behavior. Bob's future behavior can then be monitored by his contacts using the risk detection process described in FIGS. 3-8 so that Bob's contacts can receive future risky action values from Bob and make sure that Bob is indeed utilizing the risk avoidance actions set forth in his risk avoidance statement.

Figure 9:
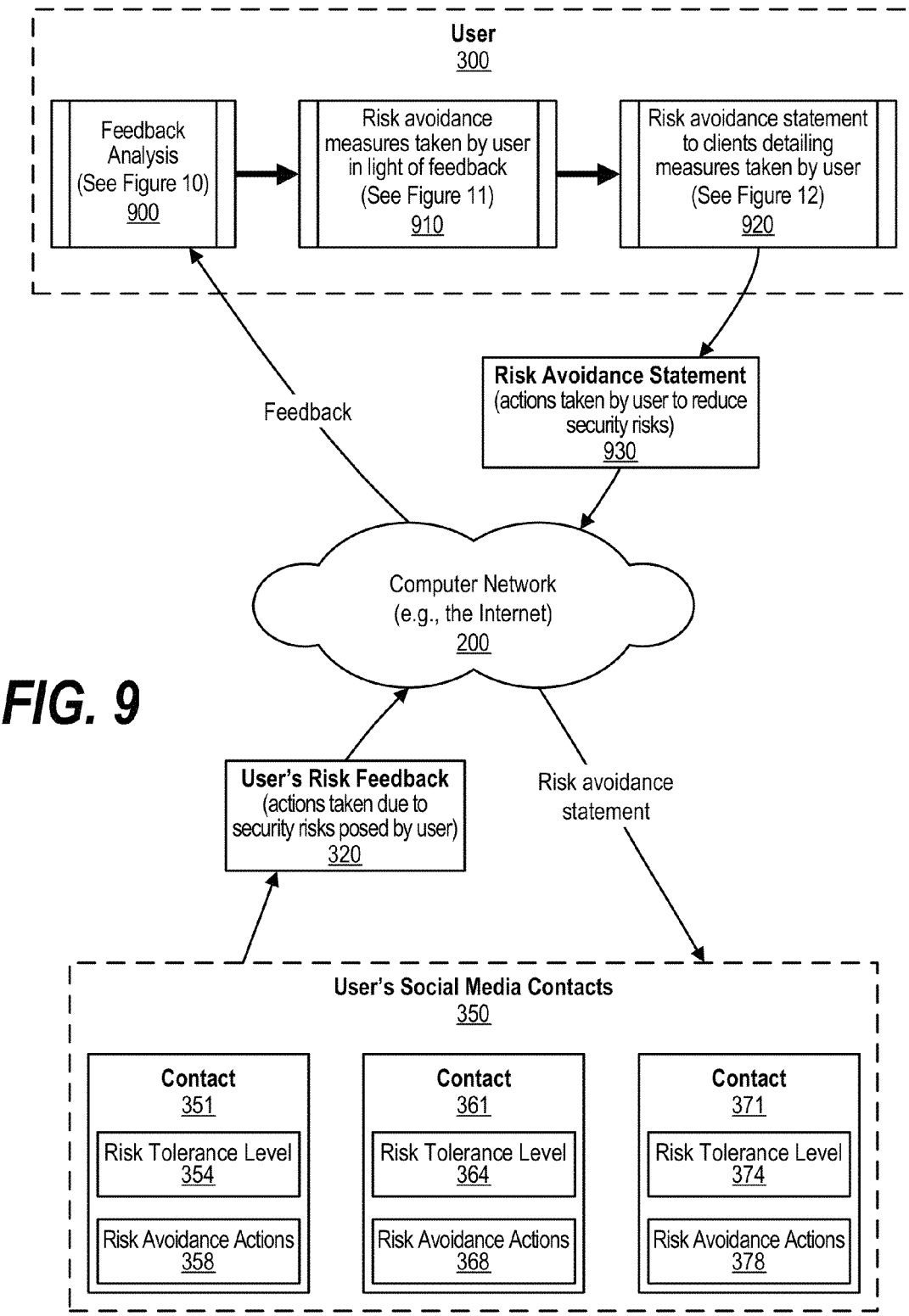
FIG. 9 is a diagram showing network components that provide a user with feedback concerning the user's online behavior as well as providing the user's contacts with information regarding the user's actions to address noted risky online behavior.

FIG. 9 is a diagram showing network components that provide a user with feedback concerning the user's online behavior as well as providing the user's contacts with information regarding the user's actions to address noted risky online behavior. Social media contacts 350 previously received risky action values from user 300 pertaining to actions that the user took on the user's information handling system. These actions may have included using an unprotected wireless network (unprotected WiFi), visiting risky websites, using poor passwords to protect resources, and the like. After receiving the user's risky action values, contacts may have performed various preventative security actions such as notifying one or more contacts, notifying the user, and disassociating (e.g., "un-friending" the user, etc.). The various contacts create risk feedback 320 with identify actions taken by the contacts in response to the risks posed by the user. Risk feedback 320 is transmitted back to the user from multiple contacts. The contacts that transmit risk feedback may have performed different actions in light of the risk posed by the user. For example, one contact may have been alerted to the risk, while another contact may have disassociated from the user when addressing the same risk posed by the user.

User 300 receives the risk feedback from the user's various contacts and performs responsive actions. At predefined process 900, the feedback received from the user's contacts is analyzed (see FIG. 10 and corresponding text for processing details). Analysis of the feedback may reveal risk avoidance measures, such as no longer using unprotected WiFi networks, etc., that the user can take to avoid, or lessen, the risk posed to the user's contacts. At predefined process 910, the user performs risk avoidance measures in light of the risk feedback received from the user's contacts (see FIG. 11 and corresponding text for processing details). After the user has performed various risk avoidance measures, a risk avoidance statement can be generated and transmitted to the user's contacts. At predefined process 920 risk avoidance statement 930 is generated and transmitted to the user's contacts 350. In one embodiment, the risk avoidance statement details the actions that were taken by the user to reduce security risks posed by the user to the user's contacts. The user's contacts 350 can then analyze risk avoidance statement 930 in order to decide whether to reverse actions that may have been taken (e.g., a contact may have disassociated (e.g., "un-friended," etc.) the user because the user was using unsecured WiFi networks and now, in light of measures taken by the user, the contact may decide to re-associate (e.g., "friend," etc.) the user on the social networking site, etc.).

Figure 10:
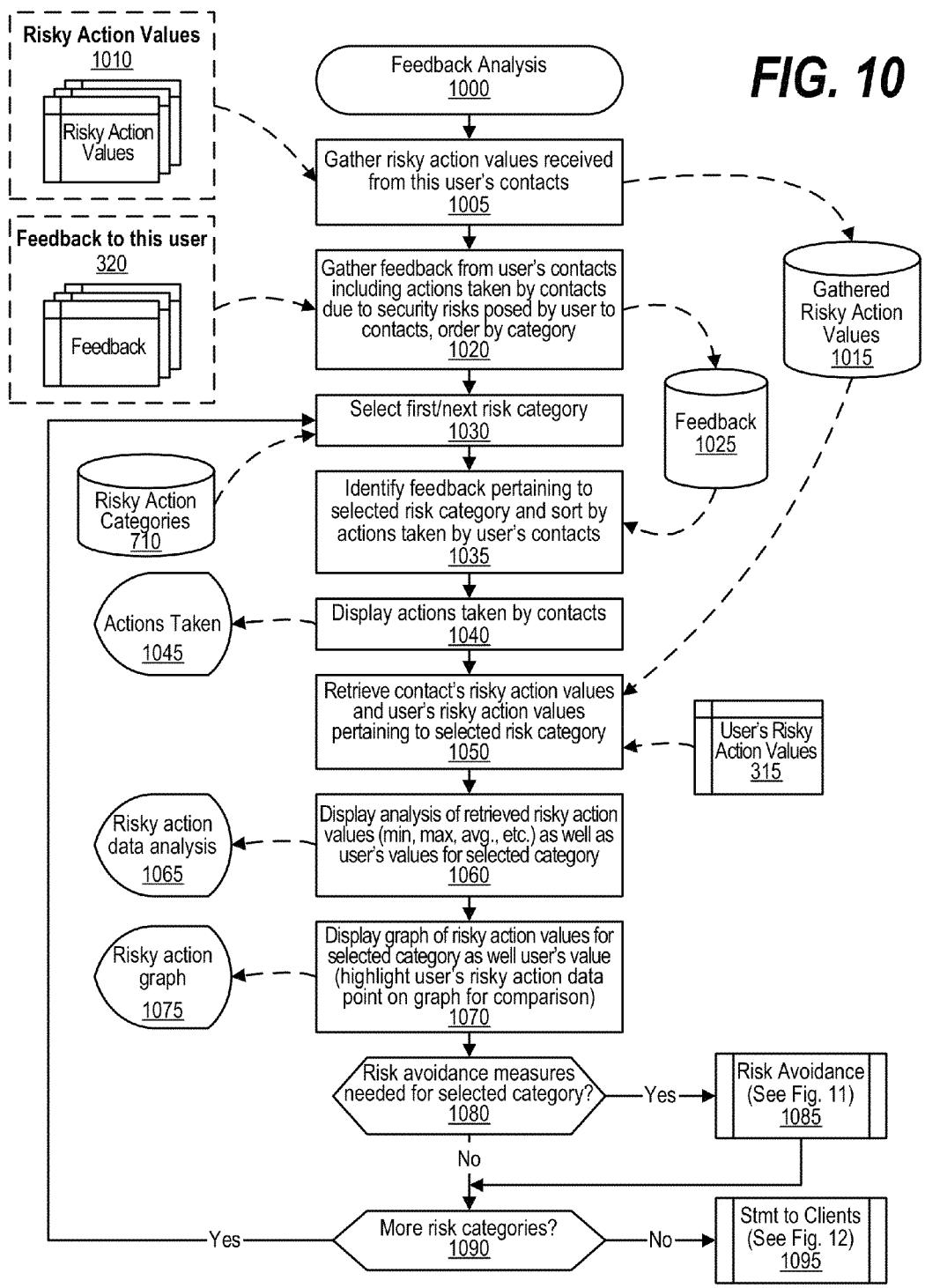
FIG. 10 is a flowchart showing steps taken by a user in receiving and analyzing feedback received from the user's contacts regarding the user's potentially risky online behavior.

FIG. 10 is a flowchart showing steps taken by a user in receiving and analyzing feedback received from the user's contacts regarding the user's potentially risky online behavior. Feedback analysis processing commences at 1000 whereupon, at step 1005, the user's information handling system gathers risky action values 1010 that were previously received from the user's contacts. The gathered risky action values are stored in gathered risky action values data store 1015. The gathered risky action values will be used to compare the user's actions with actions taken by the user's contacts. For example, the user may discover that only a small fraction of the user's contacts accesses unsecured wireless networks (unsecured WiFi), so that access of such unsecured WiFi networks is "outside the norm" of acceptable behavior performed in the user's social network.

At step 1020, feedback 320 that was transmitted to this user from the user's contacts is gathered. The feedback data includes actions that were taken by the user's contacts in light of the risks posed by the user's behavior with regards to security. The gathered feedback is ordered by risk category and stored in feedback data store 1025.

A loop to process feedback data store 1025 is initialized at 1030 with the first risk category selected from the set of risky action categories stored in data store 710. At step 1035, gathered feedback stored in data store 1025 that pertains to the selected risky action category is identified. For example, with regards to a risky action category of "use of unprotected WiFi network," numerous feedback actions may have been performed by the user's contacts with these actions ranging from notifying the contact to disassociating from the user. The actions taken by contacts for the selected risky action category are selected and sorted. At step 1040, the actions taken by the user's contacts pertaining to the selected risky action category are displayed on display 1045. In one embodiment, a graph, such as a bar graph, is displayed depicting a visual representation of the number of contacts that performed various actions (e.g., forty percent were notified, thirty percent disassociated from the user, etc.).

At step 1050, the risky action values associated with the user's contacts behavior is retrieved from gathered risky action values data store 1015 along with the user's risky action values from memory area 315. At step 1060, an analysis of the retrieved risky action values is displayed on display 1065. The analysis may include the range of risky action values (minimum, maximum, etc.) as well as other statistical measures such as the mean, median, and mode. The user's risky action values are displayed separately so that the user can better understand how the user's risky action values compares to the values associated with the user's contacts. At step 1070, a graph of the retrieved risky action values is displayed on display 1075 with the user's data point being highlighted. For example, the risky action values can be graphed with zero representing no risk and ten representing the most risk and the number of people that achieved each value also included in the graph. The user's risky action value for the selected category can also be graphed and highlighted (e.g., shown in a different color, etc.) so that the user better understands how the user's risky action value pertaining to the selected risky action category compares to the risky action values of the user's contacts.

A decision is made, based on the displayed analysis data, as to whether the user should perform one or more risk avoidance measures related to the selected risky action category (decision 1080). If the user decides to perform risk avoidance measures, then decision 1080 branches to the "yes" branch whereupon, at predefined process 1085, the risk avoidance measures are performed (see FIG. 11 and corresponding text for processing details). On the other hand, if the user decides not to perform any risk avoidance measures based on the risk analysis, then decision 1080 branches to the "no" branch bypassing predefined process 1085.

A decision is made as to whether there are more risky action categories to process (decision 1090). If there are more risky action categories to process, then decision 1090 branches to the "yes" branch which loops back to select the next risky action category from data store 710 and process it as described above. This looping continues until there are no more risky action categories to process, at which point decision 1090 branches to the "no" branch whereupon, at predefined process 1095, risk avoidance statements are generated and transmitted to the user's contacts informing the contacts of risk avoidance measures that the user has taken to reduce the risk posed by the user.

Figure 11:
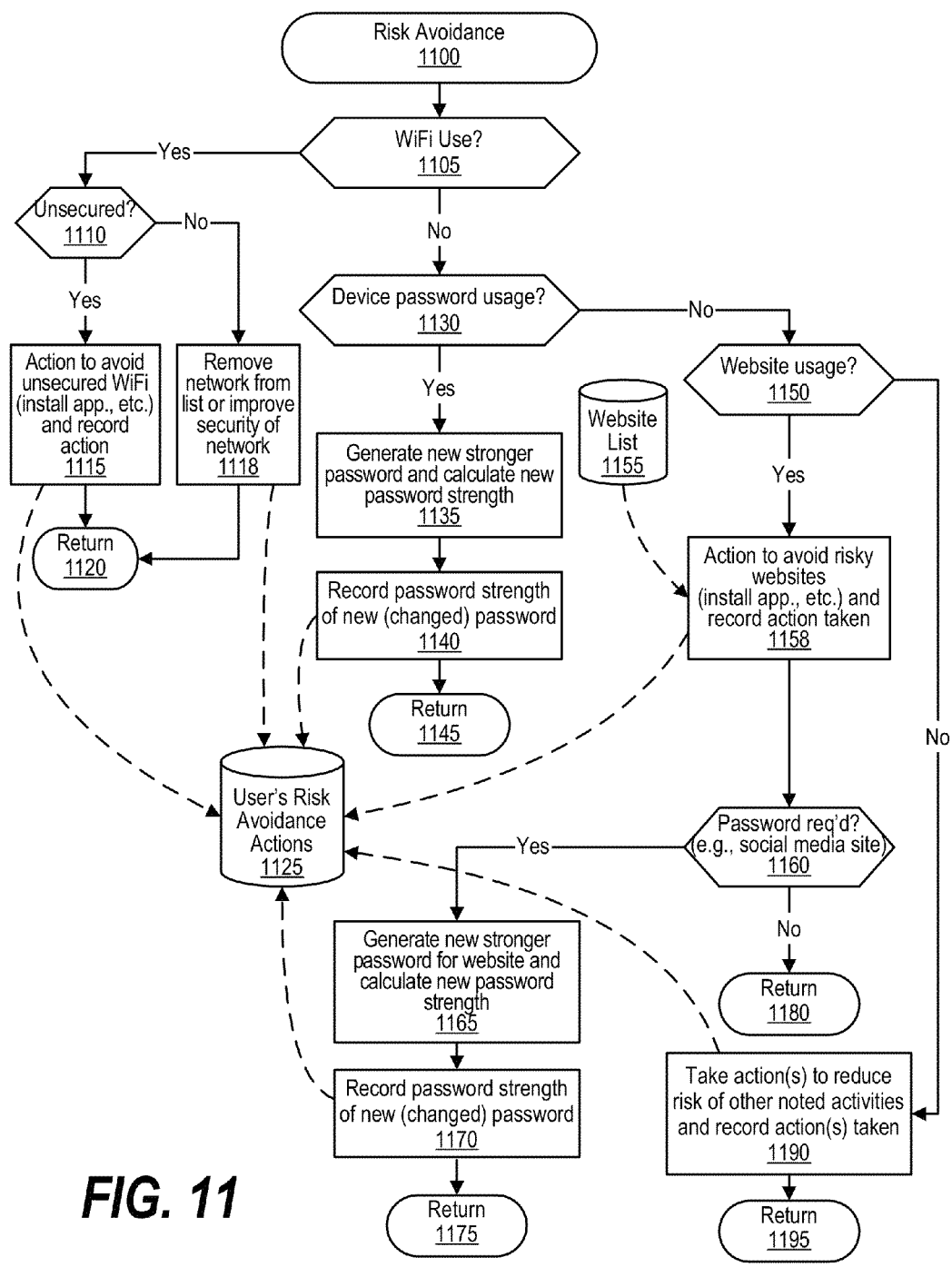
FIG. 11 is a flowchart showing steps taken by the user in acting on the feedback provided by the user's contacts in performing risk avoidance activities.

FIG. 11 is a flowchart showing steps taken by the user in acting on the feedback provided by the user's contacts in performing risk avoidance activities. Processing commences at 1100 whereupon a decision is made as to whether the user is taking a risk avoidance action pertaining to the user's use of wireless networks (decision 1105). If the user is taking risk avoidance action to address the user's WiFi usage, then decision 1105 branches to the "yes" branch whereupon a decision is made as to whether the user is using unsecured WiFi networks (decision 1110). If the user is using unsecured WiFi networks, then decision 1110 branches to the "yes" branch whereupon, at step 1115, the user performs an action to avoid the user of unsecured WiFi networks. In one embodiment, a routine is installed that disables the user's ability to access an unsecured WiFi network. The action taken by the user is recorded (stored) in user's risk avoidance actions data store 1125. In another embodiment, the user's system is instructed (e.g., with a user preference setting, etc.) to no longer automatically access WiFi networks that are in range if the WiFi network is not secured. If the user is not accessing an unsecured WiFi network, then decision 1110 branches to the "no" branch whereupon step 1118 is performed. If the network is controlled by the user and is using a weak password or protection scheme, then the user may be instructed as to how to improve the protection of the WiFi network. If the WiFi network is not under the user's control, but the protection of the WiFi network is considered weak, then the system may remove the WiFi network from the list of approved WiFi networks available from the user's information handling system. The action taken by the user is recorded (stored) in user's risk avoidance actions data store 1125. After the WiFi network use has been addressed, processing returns to the calling routine (see FIG. 10) at 1120.

Returning to decision 1105, if the user is not taking an action directed at the user's WiFi usage, then decision 1105 branches to the "no" branch whereupon a decision is made as to whether the user is taking a risk avoidance action related to a device usage password (decision 1130), such as the password used to control access to the user's information handling system or operating system. If the action being taken by the user is directed at avoiding risk due to a weak, or nonexistent, device access password, then decision 1130 branches to the "yes" branch whereupon, at step 1135, a new, stronger password is generated (e.g., random, including both upper- and lowercase characters, including a mix of numbers and letters, etc.) and applied to the device. In addition, the password strength of the new password is calculated using the same password strength calculator that was used in step 630 as shown in FIG. 6. At step 1140, the password strength of the new (e.g., changed, etc.) password is recorded, or stored, in user's risk avoidance actions 1125. Processing then returns to the calling routine (see FIG. 10) at 1145.

Returning to decision 1130, if the user is not taking action directed at usage of a device password, then decision 1130 branches to the "no" branch whereupon a decision is made as to whether the action is directed to the user's access of a website (decision 1150). Risky website list 1155 includes a list of websites that are noted, either by the user's contacts or by online security sites, as being potentially risky. At step 1158, if the user is accessing any of the risky websites as noted in risky website list 1155, then the user can take steps to avoid visiting such risky websites, such as by installing a content-control software application that blocks and filters network (e.g., Internet) content. Some content-control applications provide a "restricted" or "blacklist" function so that the risky websites noted in list 1155 can be added to the content-control application and be restricted, or blacklisted, so that the user can no longer access the risky websites from the user's system. The actions taken with respect to risky websites is then recorded, or stored, in user's risk avoidance actions data store 1125.

If the user's risk avoidance action is directed at website usage then a decision is made as to whether the action pertains to password usage at particular websites (decision 1160), such as social networking sites. If the action pertains to password usage at websites, then decision 1160 branches to the "yes" branch whereupon, at step a new, stronger password is generated (e.g., random, including both upper- and lowercase characters, including a mix of numbers and letters, etc.) and applied to the website. In addition, the password strength of the new password is calculated using the same password strength calculator that was used in step 675 as shown in FIG. 6. At step 1170, the password strength of the new (e.g., changed, etc.) password is recorded, or stored, in user's risk avoidance actions data store 1125. Processing then returns to the calling routine (see FIG. 10) at 1175. Returning to decision 1160, if the user's action pertained to website usage but not to passwords used to access websites, then decision 1160 branches to the "no" branch whereupon processing returns to the calling routine (see FIG. 10) at 1180.

Returning to decision 1150, if the user's risk avoidance action does not pertain to WiFi usage, device password usage, or website access, then decision 1150 branches to the "no" branch whereupon, at step 1190, other actions are taken to reduce the user's risk regarding other noted risky activities noted by the user's contacts. These other activities are recorded, or stored, in user's risk avoidance actions data store 1125. Processing then returns to the calling routine (see FIG. 10) at 1195.

Figure 12:
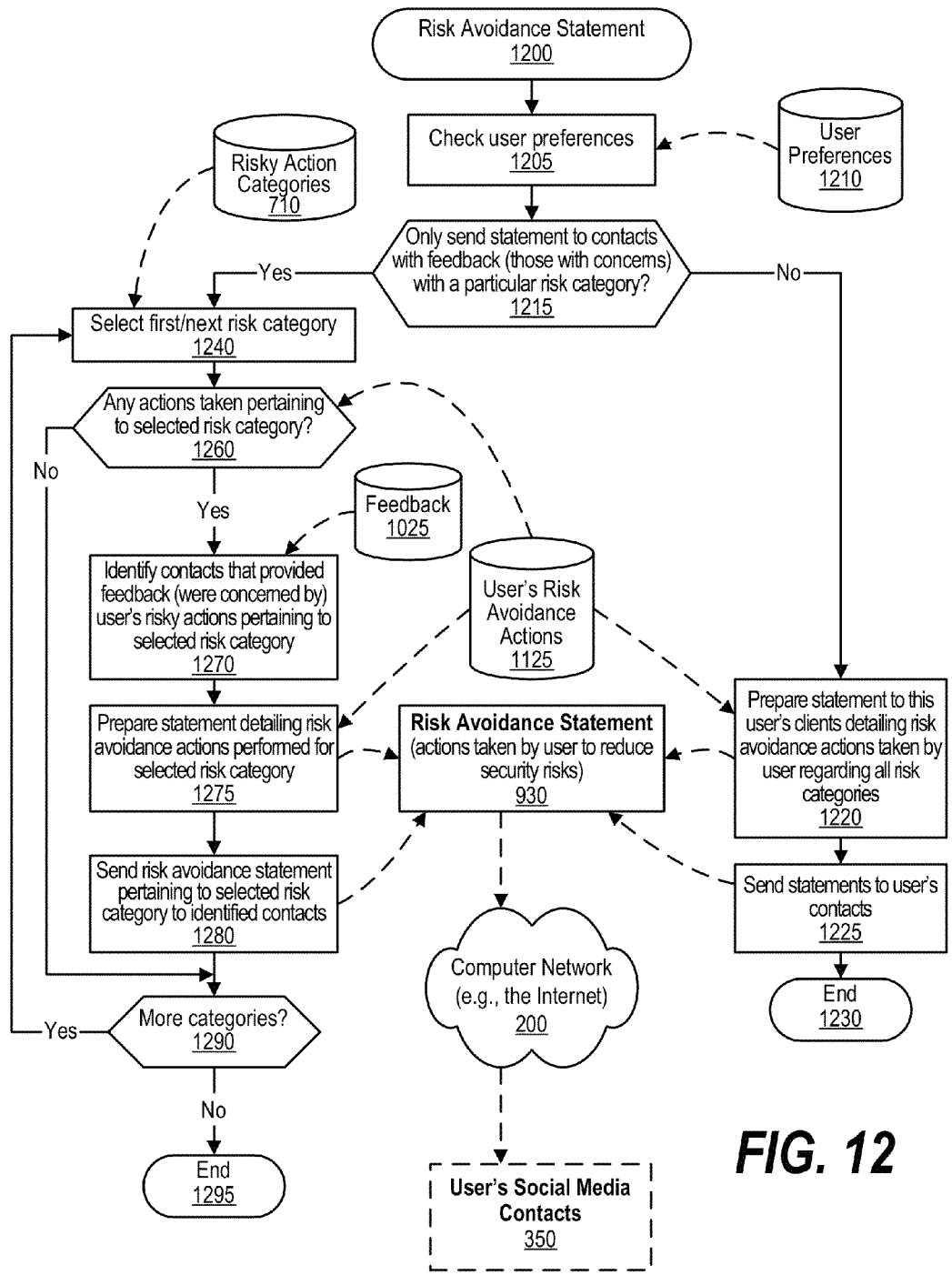
FIG. 12 is a flowchart showing steps taken by the user in preparing a risk avoidance statement of the actions taken by the user and sending the statement to the user's contacts.

FIG. 12 is a flowchart showing steps taken by the user in preparing a risk avoidance statement of the actions taken by the user and sending the statement to the user's contacts. Processing commences at 1200 whereupon, at step 1205, user preferences data store 1210 are checked. One of the preferences included in data store 1210 is whether risk avoidance statements are only sent to those contacts that noted concerns in feedback received by the user, or if risk avoidance statements are sent to all contacts. A decision is made as to whether to only send risk avoidance statements to those contacts that noted concerns in feedback received by the user (decision 1215). If all contacts are to receive the risk avoidance statements, then decision 1215 branches to the "no" branch whereupon, at step 1220, risk avoidance statement 930 is generated with the statement detailing the user's risk avoidance actions that were taken by the user and recorded (stored) in risk avoidance actions data store 1125. At step 1225, the generated statement is sent to the user's contacts 350 via computer network 200 (e.g., the Internet), such as using an email message, etc. Processing of the risk avoidance statements thereafter ends at 1230.

Returning to decision 1215, if the risk avoidance statements are only sent to the user's contacts that noted concerns regarding the user's actions in feedback that was received by the user, then decision 1215 branches to the "yes" branch to generate and send the statements as described below. At step 1240, the first risky action category is selected from risky action categories data store 710. The risk avoidance actions that were taken by the user and recorded in risk avoidance actions data store 1125 are checked to determine whether any of the actions that were taken pertain to the selected category (decision 1260). If any of the actions taken pertain to the selected category, then decision 1260 branches to the "yes" branch whereupon, at step 1270, contacts that provided feedback to the user regarding actions pertaining to the selected risky action category are identified by checking feedback data store 1025. At step 1275, risk avoidance statement 930 is generated with the statement detailing the user's risk avoidance actions pertaining to the selected risky action category with the actions taken by the user retrieved from risk avoidance actions data store 1125. At step 1280, the generated risk avoidance statement is sent to those contacts that noted concern regarding the selected risky action category (the identified contacts from step 1270). The statements are sent via computer network 200 (e.g., the Internet), such as using an email message, etc.

A decision is made as to whether there are more risky action categories to process (decision 1290). If there are more risky action categories to process, then decision 1290 branches to the "yes" branch which loops back to select the next risky action category at step 1240 and process the next category as described above. This looping continues until there are no more risky action categories to process, at which point decision 1290 branches to the "no" branch and processing ends at 1295.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory coupled to at least one of the processors;
a network adapter that connects the information handling system to a computer network; and
a set of instructions stored in the memory and executed by at least one of the processors in order to assess risk to a user of the information handling system, wherein the set of instructions perform actions of:
receiving, at the network adapter, a set of risky action values corresponding to a social network contact of the user;
performing a preventative security action based upon a risk level calculated from a selected risky action value included in the set of risky action values; and sending a risk feedback message to the social network contact that identifies the preventative security action taken by the information handling system.

2. The information handling system of claim 1 wherein the set of risky action values correspond to a plurality of risky action categories, and wherein the set of instructions performs additional actions comprising:

retrieving a set of acceptable risk levels assigned by the user, wherein the acceptable risk levels correspond to the plurality of risky action categories, and wherein at least one of the acceptable risk levels included in the set of acceptable risk levels is no acceptable risk;

identifying one of the plurality of risky action categories corresponding to the selected risky action value, wherein the identified risky action category has been assigned the no acceptable risk level; and performing the preventative security action based on the calculated risk level in response to detecting that the selected risky action value corresponding to the identified risky action category is greater than zero.

3. The information handling system of claim 1 wherein the set of instructions performs additional actions comprising:

identifying a risky action category corresponding to the selected risky action value; and identifying a priority level corresponding to the identified risky action category, wherein the calculated risk level is based on the selected risky action value and the identified priority level.

4. The information handling system of claim 1 wherein the set of instructions performs additional actions comprising:

identifying a risky action category corresponding to the selected risky action value; and retrieving one or more threshold values corresponding to the identified risky action category, wherein each of the threshold values is associated with one or more preventative security actions that includes the preventative security action; and selecting one of the threshold values based on the selected risky action value, wherein the preventative security action that is performed is associated with the selected threshold value.

5. The information handling system of claim 4 wherein the set of instructions performs additional actions comprising:

receiving the one or more threshold values and the associated one or more preventative security actions from the user prior to receiving the set of risky action values; and storing the one or more threshold values and the associated one or more preventative security actions in a nonvolatile memory area accessible to at least one of the processors.

6. The information handling system of claim 1 wherein the set of instructions performs additional actions comprising:

identifying a risky action category corresponding to the selected risky action value;

identifying a priority level corresponding to the identified risky action category, wherein the risk level is calculated based on the selected risky action value and the identified priority level;

retrieving one or more threshold values corresponding to the identified risky action category, wherein each of the threshold values is associated with one or more preventative security actions that includes the preventative security action; and selecting one of the threshold values based on the calculated risk value, wherein the preventative security action that is performed is associated with the selected threshold value.

7. The information handling system of claim 6 wherein the set of instructions performs additional actions comprising:

calculating a second risk level corresponding to a second set of one or more of the risky action values;

identifying a second risky action category corresponding to the second set of risky action values;

selecting a second threshold value corresponding to the second risky action category;

identifying an accumulated threshold value;

identifying a second priority level corresponding to the identified risky action category, wherein the second risk level is calculated based on the second set of risky action values and the identified second priority level;

accumulating the first and second risk levels in an accumulated risk level; and performing a preventative security action based on the accumulated risk level exceeding the identified accumulated threshold value.

8. The information handling system of claim 1 wherein the set of instructions performs additional actions comprising:

analyzing a risk avoidance statement sent from the social network contact in response to the social network contact receiving the risk feedback message; and reversing the preventative security action in response to the analysis of the risk avoidance statement.

9. A computer program product stored in a computer readable storage device, comprising functional descriptive material that, when executed by an information handling system, causes the information handling system to perform actions that include:

receiving a set of risky action values corresponding to a social network contact, the social network contact corresponding to a user of the information handling system;

performing a preventative security action based upon a risk level calculated from a selected risky action value included in the set of risky action values; and sending a risk feedback message to the social network contact that identifies the preventative security action taken by the information handling system.

10. The computer program product of claim 9 wherein the set of risky action values correspond to a plurality of risky action categories, and where the actions further comprise:

retrieving a set of acceptable risk levels assigned by the user, wherein the acceptable risk levels correspond to the plurality of risky action categories, and wherein at least one of the acceptable risk levels included in the set of acceptable risk levels is no acceptable risk;

identifying one of the plurality of risky action categories corresponding to the selected risky action value, wherein the identified risky action category has been assigned the no acceptable risk level; and performing the preventative security action based on the calculated risk level in response to detecting that the selected risky action value corresponding to the identified risky action category is greater than zero.

11. The computer program product of claim 9 wherein the actions further comprise:

identifying a risky action category corresponding to the selected risky action value; and identifying a priority level corresponding to the identified risky action category, wherein the calculated risk level is based on the selected risky action value and the identified priority level.

12. The computer program product of claim 9 wherein the actions further comprise:

identifying a risky action category corresponding to the selected risky action value; and retrieving one or more threshold values corresponding to the identified risky action category, wherein each of the threshold values is associated with one or more preventative security actions that includes the preventative security action; and selecting one of the threshold values based on the selected risky action value, wherein the preventative security action that is performed is associated with the selected threshold value.

13. The computer program product of claim 12 wherein the actions further comprise:

receiving the one or more threshold values and the associated one or more preventative security actions from the user prior to receiving the set of risky action values; and storing the one or more threshold values and the associated one or more preventative security actions in a nonvolatile memory area accessible to the information handling system.

14. The computer program product of claim 9 wherein the actions further comprise:

identifying a risky action category corresponding to the selected risky action value;

identifying a priority level corresponding to the identified risky action category, wherein the risk level is calculated based on the selected risky action value and the identified priority level;

retrieving one or more threshold values corresponding to the identified risky action category, wherein each of the threshold values is associated with one or more preventative security actions that includes the preventative security action; and selecting one of the threshold values based on the calculated risk value, wherein the preventative security action that is performed is associated with the selected threshold value.

15. The computer program product of claim 14 wherein the actions further comprise:

calculating a second risk level corresponding to a second set of one or more of the risky action values;

identifying a second risky action category corresponding to the second set of risky action values;

selecting a second threshold value corresponding to the second risky action category;

identifying an accumulated threshold value;

identifying a second priority level corresponding to the identified risky action category, wherein the second risk level is calculated based on the second set of risky action values and the identified second priority level;

accumulating the first and second risk levels in an accumulated risk level; and performing a preventative security action based on the accumulated risk level exceeding the identified accumulated threshold value.

16. The computer program product of claim 9 wherein the actions further comprise:

analyzing a risk avoidance statement sent from the social network contact in response to the social network contact receiving the risk feedback message; and reversing the preventative security action in response to the analysis of the risk avoidance statement.

\* \* \* \* \*